(12) United States Patent
Cosse, III et al.

(10) Patent No.: US 7,275,345 B2
(45) Date of Patent: Oct. 2, 2007

(54) PNEUMATIC LIFTING SYSTEM AND METHOD

(76) Inventors: Irvy E. Cosse, III, 1130 St. Charles Ave., New Orleans, LA (US) 70130; Steven E. Whiteside, 253 Devon Dr., Mandeville, LA (US) 70448

( * ) Notice: Subject to any disclaimer, the term of this patent is extended or adjusted under 35 U.S.C. 154(b) by 326 days.

(21) Appl. No.: 10/913,131

(22) Filed: Aug. 6, 2004

(65) Prior Publication Data

US 2006/0042878 A1    Mar. 2, 2006

(51) Int. Cl.
    *A47G 7/00* (2006.01)
(52) U.S. Cl. .................. 47/39; 280/79.2; 280/79.5; 15/261; 220/23.4
(58) Field of Classification Search .............. 280/79.5, 280/79.2; 47/39, 65, 65.5, 66.1, 66.7, 71; 15/261, 264; 220/23.4
    See application file for complete search history.

(56) References Cited

U.S. PATENT DOCUMENTS

| 585,931 | A |   | 7/1897 | Gridley |
| 896,050 | A |   | 8/1908 | Zwemer |
| 2,379,476 | A |   | 7/1945 | Cleveland |
| 3,528,676 | A | * | 9/1970 | Giancarlo ................ 280/79.2 |
| 4,461,455 | A | * | 7/1984 | Mills et al. ................ 254/3 R |
| 5,551,715 | A |   | 9/1996 | Pickard |
| 5,921,899 | A | * | 7/1999 | Rose ........................ 482/112 |
| 6,082,956 | A | * | 7/2000 | Pentland ..................... 414/495 |
| 6,128,853 | A |   | 10/2000 | Klonel et al. |
| 6,209,891 | B1 | * | 4/2001 | Herrmann .................. 280/32.6 |
| 6,425,146 | B1 | * | 7/2002 | O'Brien et al. .............. 4/560.1 |
| 6,594,951 | B1 | * | 7/2003 | Reynolds ........................ 47/39 |
| 6,639,654 | B2 | * | 10/2003 | Binnard et al. ................ 355/72 |
| 6,929,249 | B1 | * | 8/2005 | Kim ........................ 254/93 HP |
| 7,017,228 | B2 | * | 3/2006 | Silverstein et al. ......... 16/35 R |

* cited by examiner

*Primary Examiner*—J. Allen Shriver
(74) *Attorney, Agent, or Firm*—Joseph T. Regard, Ltd plc

(57) ABSTRACT

A lifting device and method therefore utilizing an air bag or the like for lifting an object supported by a wheeled platform or the like, from a stationary, parked configuration wherein the object conceals the wheeled platform and supports the object, to a lifted, configuration whereby the wheeled platform supports the object, allowing same to be easily moved via the wheeled platform. The preferred embodiment of the present invention contemplates a planter unit comprising a pot or the like for containing a plant, said pot having a false bottom wherein there is situated a support platform having castors or the like thereon, and an air bag or other flexible container configured to be filled with fluid situated between the wheeled platform and the underside of the pot. In use, the false bottom has a cavity formed therein to enclose the wheeled platform, the false bottom having a lower edge supporting the pot when the air bag is uninflated. To lift the pot and raise the lower edge of the false bottom from the floor, the air bag or the like is filled with air via a hand pump or compressed air source, which expands the bag so as to lift the planter such that the wheeled support then supports the planter. The walls forming the false bottom surround the air bag in its inflated condition, stabilizing the unit so that it may be wheeled to its desired location, and preventing "rolling" of the airbag and planter from the platform.

29 Claims, 6 Drawing Sheets

ND METHOD

TECHNICAL FIELD OF THE INVENTION

The present invention relates to lifts for lifting objects, and more particularly to a lifting device utilizing an air bag or the like for lifting an object supported by a wheeled platform or the like, from a stationary, parked configuration wherein the device conceals the wheeled platform and supports the object, to a lifted, configuration whereby the wheeled platform supports the object, allowing same to be easily moved via the wheeled platform.

The preferred embodiment of the present invention contemplates a planter unit comprising a pot or the like for containing a plant, said pot having a false bottom wherein there is situated a support platform having castors or the like thereon, and an air bag or other flexible container configured to be filled with fluid situated between the wheeled platform and the underside of the pot.

In use, the false bottom has a cavity formed therein to enclose the wheeled platform, the false bottom having a lower edge supporting the pot when the air bag is uninflated. To lift the pot and raise the lower edge of the false bottom from the floor, the air bag or the like is filled with air via a hand pump or compressed air source, which expands the bag so as to lift the planter such that the wheeled support then supports the planter. The walls forming the false bottom surround the air bag in its inflated condition, stabilizing the unit so that it may be wheeled to its desired location, and preventing "rolling" of the airbag and planter from the platform during the moving thereof.

BACKGROUND OF THE INVENTION

U.S. Pat. No. 6,594,951 issued 2003 teaches a planter having a false bottom containing a set of casters mounted to a common frame, which is raised or lowered via crank 26 which operates an internally situated scissor jack, to raise a planter for repositioning via the casters, or lower the pot to securely set the pot on the ground, and conceal the casters within the false bottom.

U.S. Pat. No. 5,571,715 teaches a "utility basket" having casters selectively used to transport the unit, which casters may be concealed in a false bottom.

U.S. Pat. No. 585,931 teaches a "Flower Pot Support" dated 1897 contemplating casters which may be selectively concealed in a false bottom or lowered to support the unit for movement.

U.S. Pat. No. 896,050 teaches a "Stove Caster" having vertically adjustable wheels for lifting or lowering the wheels for selective rolling of the unit.

U.S. Pat. No. 2,379,746 issued 1945 teaches a "Mop Pail" whereby casters are pivotally adjusted via connector rods from a raised, non-supporting position, to a lowered, supporting position whereby the pail may be rolled.

U.S. Pat. No. 6,128,853 issued 2000 teaches a planter having casters situated in a hidden bottom, although they do not appear adjustable.

While the prior art contemplates lifting devices for planters, baskets, pails or the like, the patents appear to rely upon mechanical devices to do the lifting, including scissor jacks, gears, pivots, or the like. These mechanical devices would tend to have limited lift capacity, are generally more expensive to manufacture, require maintenance and upkeep, and would appear to be more prone to failure when compared to the system of the present invention.

GENERAL SUMMARY DISCUSSION OF THE INVENTION

The present invention provides a lifting system and method therefore which is easier to manufacture and implement, more economical, utilizes less in the way of moving parts, requires little in the way of maintenance or upkeep, and should provide greater lifting capacity at a lesser cost than the systems described in the prior art.

The preferred embodiment of the present invention contemplates a movable planter system wherein there is provided a plant pot or the like having a false bottom containing a platform supported by a set of casters, providing a wheeled platform, and a bladder or air bag situated between the platform and planter bottom. The system is configured such that the wheeled platform is completely enclosed within the false bottom when the planter is in a "parked" position. When the planter is desired to be moved, the bladder or air bag is filled with fluid such as air, lifting the pot so as to be supported by the wheeled platform, so that the planter may then be easily wheeled to a new location. The air is then vented from the bladder or air bag, lowering the planter so that the lower edge of the false bottom rests upon the floor, supporting the planter firmly in place and concealing the wheeled platform.

The false bottom provides a cavity enclosing the air bag and wheeled platform when the bladder or air bag is uninflated. When the bladder is inflated, it expands to engage the bottom of the pot and the top surface of the platform, urging same apart. The inner side walls of the false bottom cavity surround the bladder, and may be used to prevent further sideways expansion of said airbag, facilitating expansion vertically in the airbag, thereby increasing lifting efficiency and allowing an airbag to be used which may have less strength than one which is unsupported on all sides when expanded.

It is therefore an object of the present invention to provide a bladder lifting system for lifting an object supported upon a wheeled platform.

It is another object of the present invention to provide a container having a false bottom having a cavity therein for containing a wheeled platform having a lifting bladder thereon, said cavity being walled to provide side support to said lifting bladder, for selectively lifting and lowering said container from a position wherein said container engages the floor to a lifted position wherein said container is supported by said wheeled platform.

It is another object of the present invention to provide a planter system which is selectively supported by a hidden, wheeled platform via a lifting bladder juxtaposed between said planter and platform.

It is still another object of the present invention to provide a method for moving a planter utilizing a lifting bladder.

It is still another object of the present invention to provide a method for lifting an object utilizing a lifting bladder juxtaposed between said object and a wheeled platform.

It is another object of the present invention to provide a container having a false bottom having a supporting bottom edge and a cavity therein having sidewalls to enclose a platform having a lifting bladder thereon, wherein said lifting bladder may be filled with fluid to lift said container so as to be supported by said platform, and wherein said sidewalls prevent further sideways expansion of the lifting bladder, to facilitate support and/or vertical lifting of said container upon said platform.

It is another object of the present invention to provide a pneumatic lifting device and method utilizing a support platform having a lifting bladder thereon having an object thereon, the object having sidewalls enveloping said lifting bladder.

Finally, it is an object of the present invention to provide a false bottom rolling planter which may be selectively lowered to fixed stationary position or lifted to a wheeled, positionable orientation which is easier to implement, more effective in operation, and less expensive to manufacture or maintain than prior art systems.

BRIEF DESCRIPTION OF DRAWINGS

For a further understanding of the nature and objects of the present invention, reference should be had to the following detailed description, taken in conjunction with the accompanying drawings, in which like parts are given like reference numerals, and wherein.

DETAILED DISCUSSION OF THE INVENTION

Figure 1:
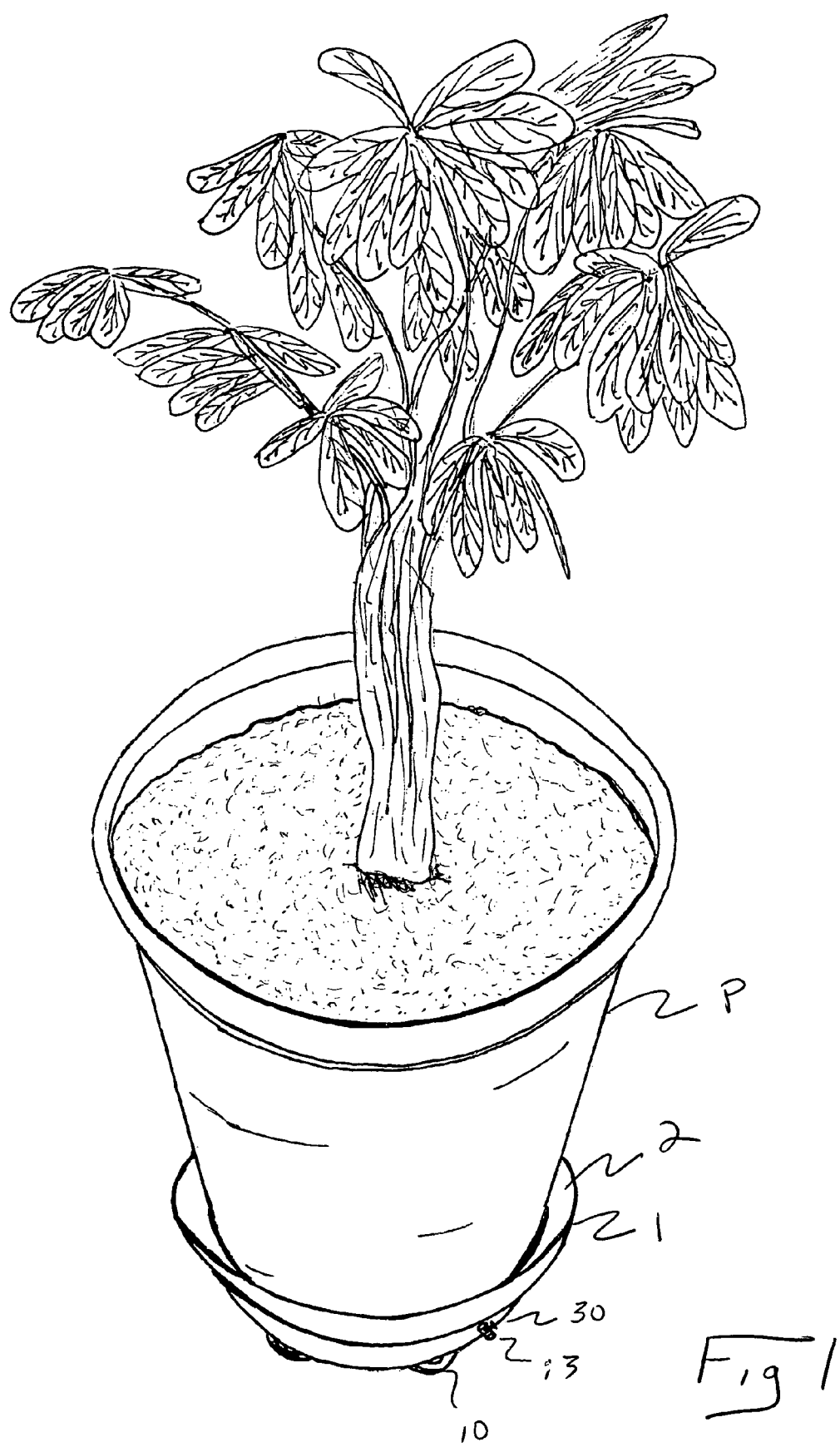
FIG. 1 is a side, isometric view of the preferred embodiment of the pneumatic lifting system and method, illustrating its use in with a planter having a water bowl having hidden casters on a support platform thereunder.
Figure 2:
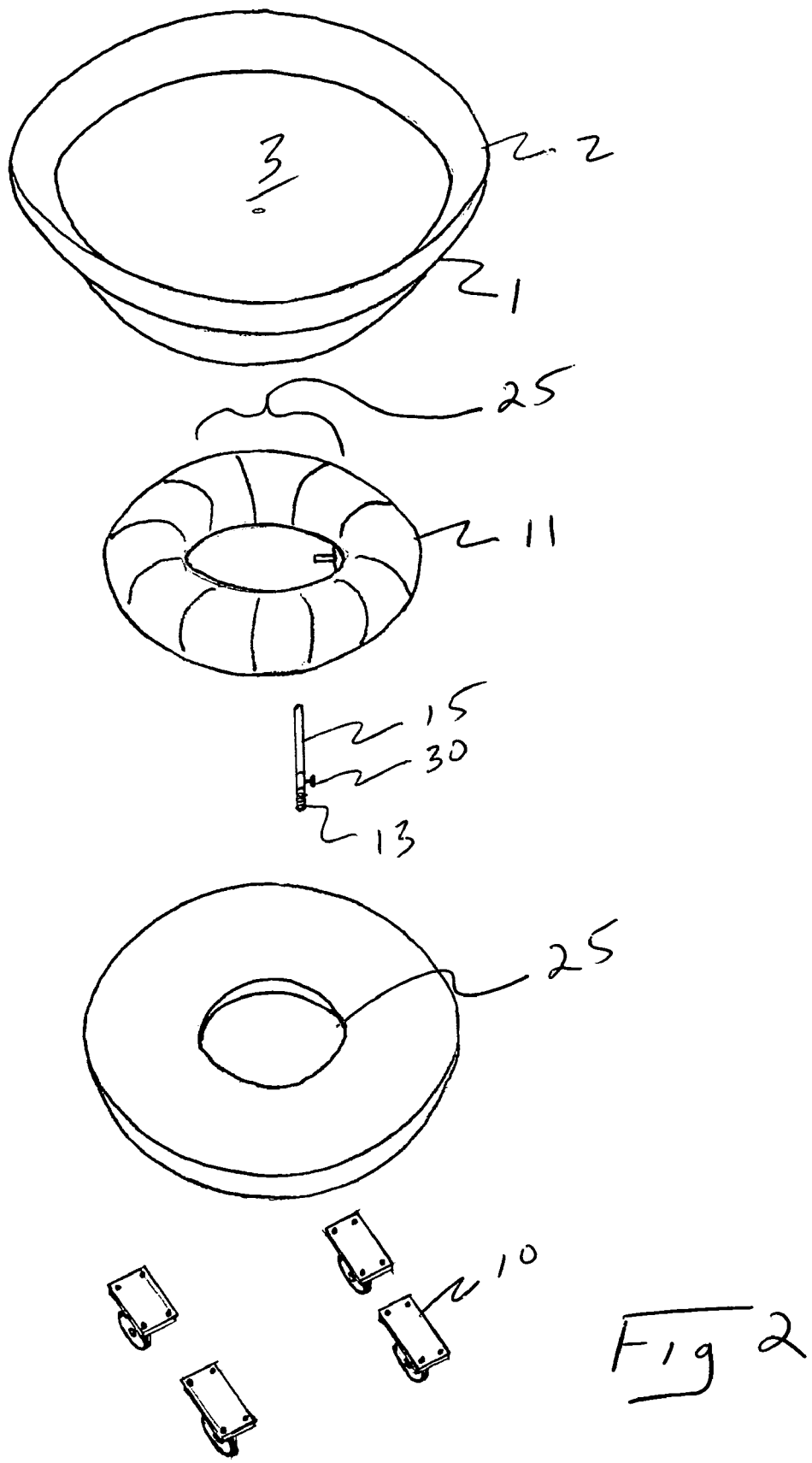
FIG. 2 is a side, isometric, exploded view of the water bowl having hidden casters and a support platform thereunder, further illustrating an air bladder and inflation tube.
Figure 3:
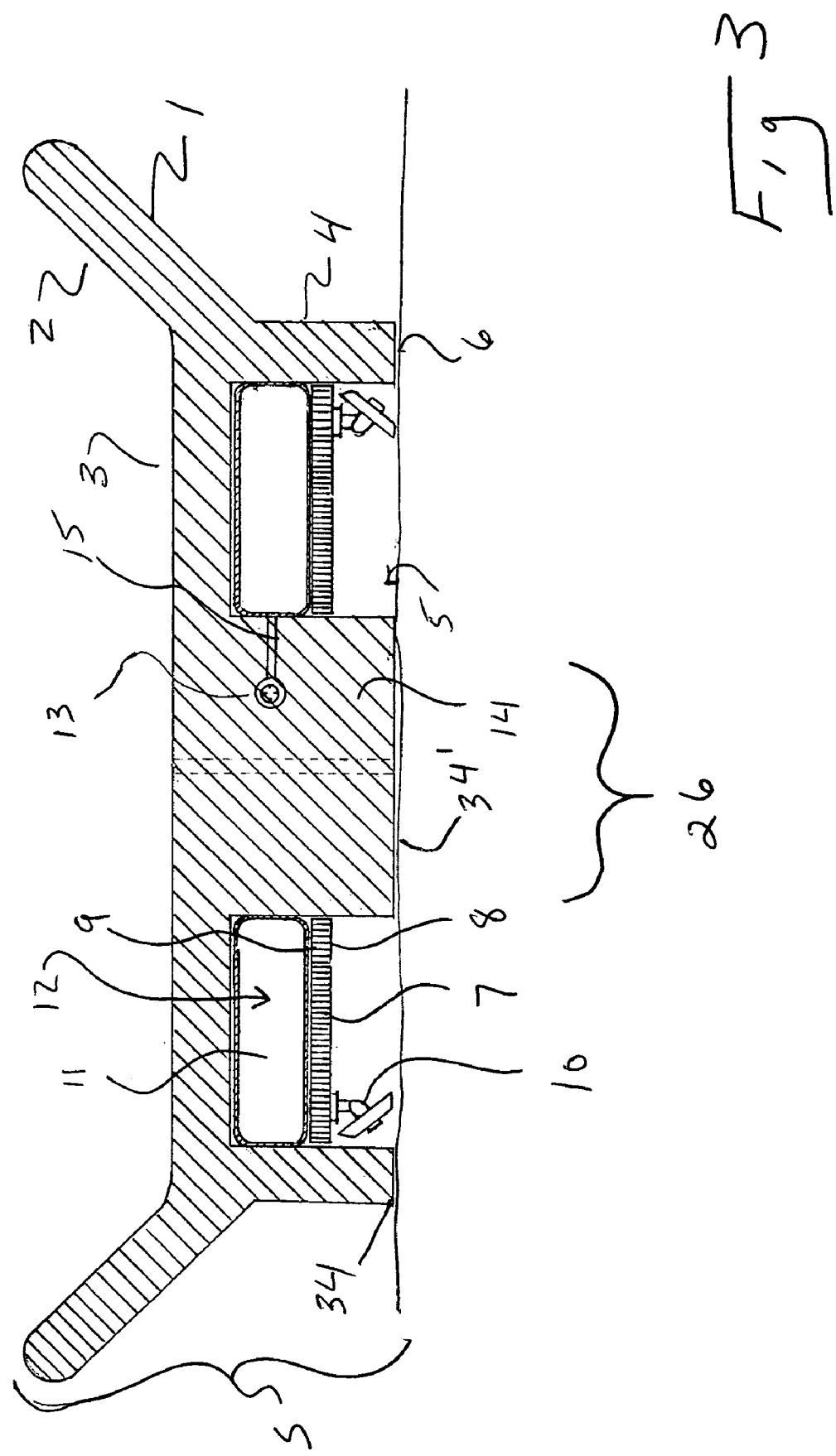
FIG. 3 is a side, cut-away view of the water bowl of FIG. 2, with the air bladder in an uninflated state.

Referring to FIGS. 1, 2 and 3 of the drawings, the system S of the preferred embodiment of the present invention utilizes a uniquely designed and configured drain bowl 1 for receiving a plant pot P or the like thereupon to form a planter, the drain bowl 1 having an upper raised edge 2 about its perimeter to form a catch basin about the pot thereon, the pot P supported upon the bowl 1 via the support surface 3, so that the raised edge envelopes the lower portion of the pot when situated upon the support surface 3 to catch any water flowing therefrom.

Further provided in the drain bowl 1 is a base 4 having a cavity 5 formed therein, the base 4 having a lower edge formed to selectively engage the ground via a lift structure situated within the cavity 5 formed in the base 4, as will be more fully explained herein.

As shown, a lift platform 7 having upper 8 and lower 9 surfaces is situated within cavity 5, the lift platform having engaged to the lower 9 surface a set of casters 10 or wheels, the upper 8 surface having situated thereon a lift bladder 11, air bag, air bladder, or the like, the lift bladder 11 forming an fluid or air cavity 12 with the application of fluid (such as water) or air 16 therein via an inflation valve 13 (which could comprise, for example, a schrader type air valve) connected to the lift bladder 11 via passage or tube 15 so that the inflation valve may be situated exterior the outer surface of the the base for easy access by the user.

In the uninflated condition, the lift support platform 7, with its casters 10 or wheels thereunder and lift bladder 11 thereupon is situated in concealed fashion within the cavity 5 formed in the base 4 of the drain bowl 1, such that the lower edge 6 of the base rests upon the floor the bowl with the pot or the like supported thereon is substantially anchored in place by the weight of the unit and contents of the pot thereon.

Figure 4:
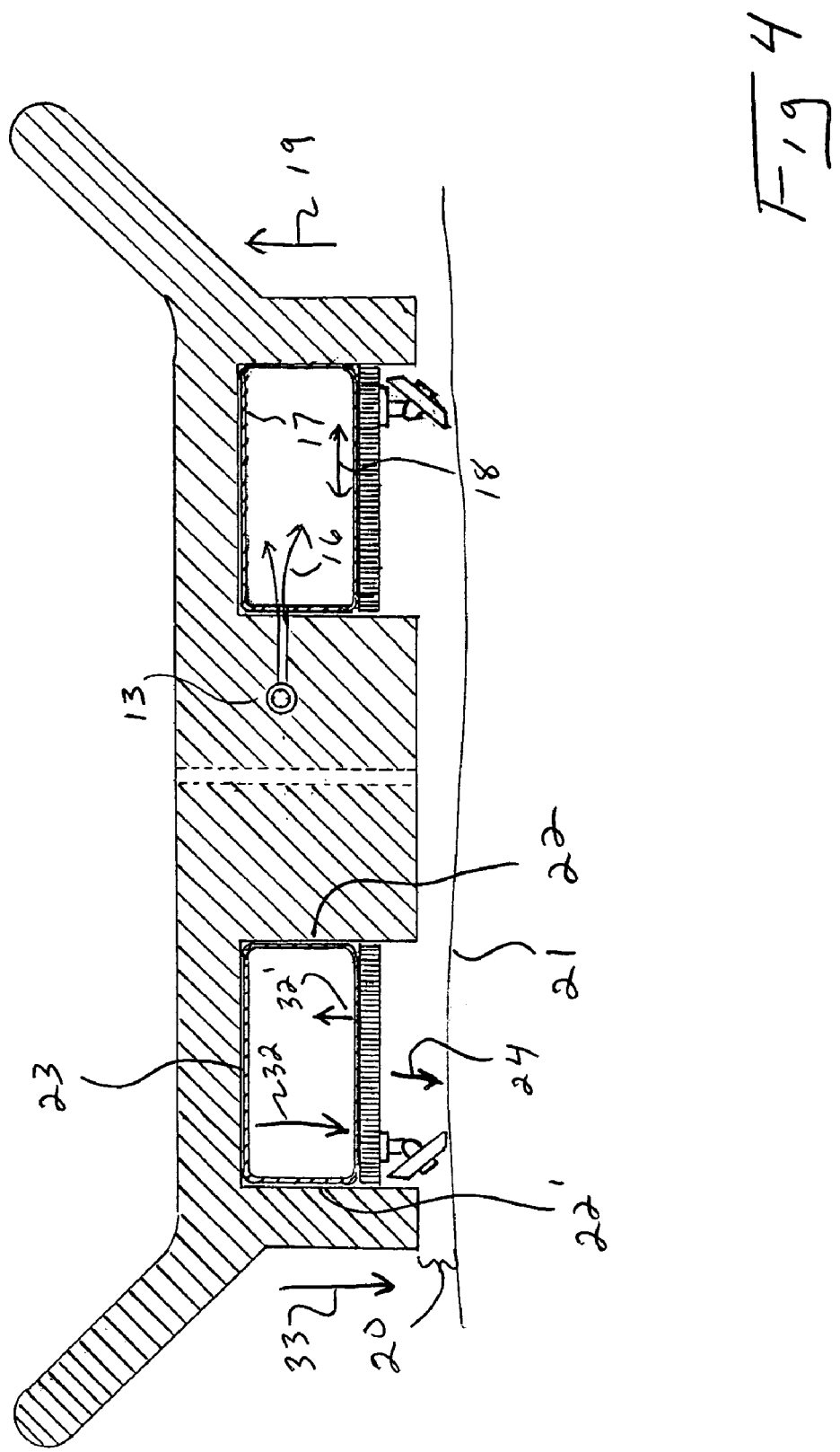
FIG. 4 is a side, cut-away view of the water bowl of FIG. 3, with the air bladder in an inflated state.
Figure 5:
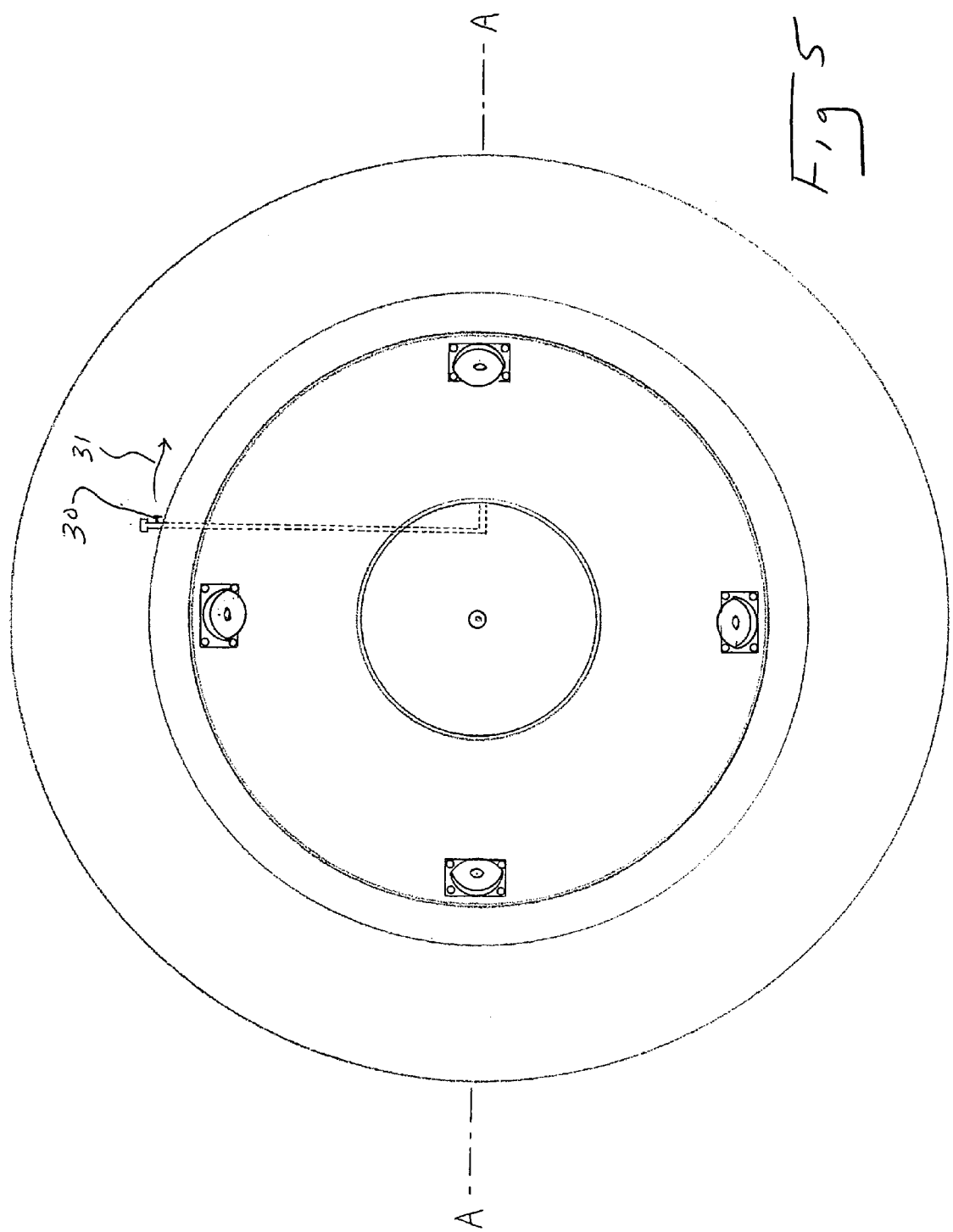
FIG. 5 is a bottom view of the water bowl of FIG. 3, illustrating the inflation tube in phantom.
Figure 6:
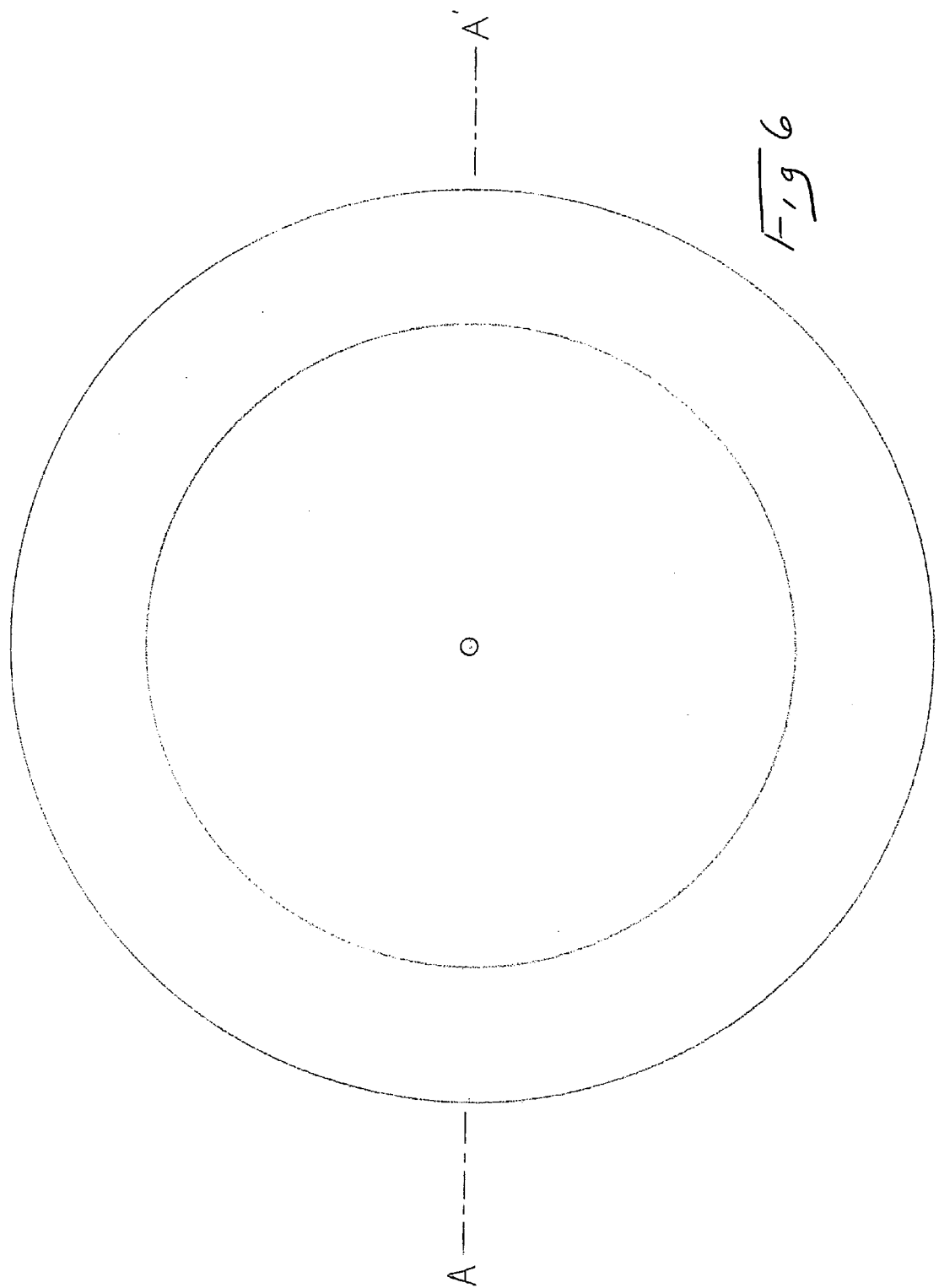
FIG. 6 is a top view of the lower body of the water bowl of FIG. 3.

Continuing with FIGS. 2, 3 and 4, the lift bladder 11 of the preferred, exemplary embodiment of the present invention is in the form of a tire tube or the like in the form of a circular ring or doughnut configuration having a generally centrally situated hole 25 therethrough. The lift platform 7 is formed to engage the lower portion of the tire tube and is thereby of flat circular construction likewise having a hole 25' formed in its middle, so as to allow a central load bearing member forming part of the base 4 to pass selectively pass through the holes 25, 25' formed in the tube and lift platform for ground engagement at its bottom 34' (along with the lower edge 6 which forms the outer perimeter wall concealing the casters 10) when the unit is not lifted by the inflated lift bladder. In an alternative embodiment of the invention, the central load bearing member may engage the ground without the requirement of the sidewalls 22 lower edge 6 engaging the ground.

As shown, the cavity side walls 22 and upper wall 23 of the base contain the lift bladder side walls 17 and upper portion, respectively, while the upper 8 surface of the lift platform 7, in conjunction with the side walls 22 and upper wall 23 of the base contain the lift bladder 11 and allow expansion only within predefined perimeters.

Upon the bladder being filled with air or the like, the lift bladder expands 18 to engage the static side walls 22 and upper wall of the cavity, and upon further expansion, provides downward 24 force 32 against the lift platform, lifting 19 the drain bowl 1 and contents thereon such that the lower edge 6 of the base is lifted via spaced 20 relationship with the ground 21 or floor, and thereby no longer engages the floor, and the casters 10 engage the ground.

Accordingly, the bladder is allowed to expand during inflation within the static confines of the base cavity side walls 22 and upper wall 23, whereupon the lift bladder may only further expand in a downward vector against the upper surface of the lift platform 7, which in turn lifts the drain bowl 1 upon expansion of the lift bladder, and lowers the drain bowl upon deflation and contraction of said lift bladder 11.

The drain bowl thereby is riding upon the bladder and support platform when the lift bladder is inflated so as to lift said drain bowl, so that the drain bowl 1 and any object thereon (such as a plant pot P) may be easily relocated by pushing the object or drain bowl, as the casters 10 are engaging the ground and should easily roll along same.

Upon reaching the desired point of relocation, a user need only drain the air from the lift bladder 17, which may be accomplished by venting the inflation valve, or by providing a drain valve 30 which also engages the air passage or tube 15 to the lift bladder, which drain valve may be used to vent 31 the bladder, causing same to contract 32', lowering the base 33 until the bottom 34' or lower edge engages 34 the ground, thereby re-concealing the casters and lift platform within the cavity in the base, and anchoring the drain bowl and object thereon via the weight of same (and the object thereon), the wheels or casters associated with the lift platform no longer bearing the weight of the drain bowl.

The lift bladder is utilized as a medium for storing the lifting fluid, in the present example, compressed air, and need not have substantial lifting strength on its own as the walls of the cavity and support platform contain the bladder and prevent excessive expansion.

The lift bladder may be inflated by an ordinary bicycle pump or other compressed air source, but it is again reiterated that the present system should not be considered limited to the use of air lifting means. For example, a system maybe provided wherein pressurized tap water source is used to fill the bladder and lift the unit upon the casters, which water may then be drained thereafter to lower the unit and conceal the casters to an observer of the unit.

| Element Listing | |
|---|---|
| S | System |
| P | Pot |
| 1 | drain bowl |
| 2 | upper edge to form catch basin |
| 3 | support surface |
| 4 | base |
| 5 | cavity |
| 6 | lower edge |
| 7 | lift platform |
| 8 | upper |
| 9 | lower surfaces |
| 10 | casters or wheels associated with lower surface |
| 11 | lift bladder or bag situated upon upper surface; tire tube |
| 12 | air cavity |
| 13 | inflation valve (schrader type) |
| 14 | outer surface |
| 15 | passage or tube |
| 16 | air |
| 17 | lift bladder side walls |
| 18 | expand |
| 19 | lifting |
| 20 | space |
| 21 | ground or floor |
| 22 | cavity side walls fixed and non expanding |
| 23 | "      upper wall" |
| 24 | downward force |
| 25,' | hole |
| 26 | central load bearing member |
| 30 | drain valve |
| 31 | vent |
| 32' | bladder contracts |
| 33 | base lowers |
| 34 | edge engages ground |

An exemplary method of the present invention may thereby be summarized as follows:

The method of repositioning an object, comprising the steps of:

a. providing a pneumatic lifting system, comprising:

a support surface having a base, said base having formed therein sidewalls having a bottom edge, and a cavity formed therebetween having an upper wall;

a lift platform situated in said cavity, said lift platform having a top and bottom surfaces, said bottom surface having wheels mounted thereto;

a lift bladder situated upon said lift platform within said cavity formed in said base;

whereby said bottom edge of said sidewalls of said base rest upon the ground until said lift bladder is filled with fluid, whereupon said lift bladder urges said base upward, raising said bottom edge of said sidewalls above the ground so that said base is supported by said wheels mounted to said bottom surface of said lift platform.

b. placing said object upon said support surface;

c. allowing said bottom edge of said sidewalls of said base to rest upon the ground;

d. filling said lift bladder with fluid, providing an expanding lift bladder;

e. allowing said expanding lift bladder to urge said base upward, raising said bottom edge of said sidewalls above the ground so that said base is supported by said wheels mounted to said bottom surface of said lift platform;

f. pushing said object to facilitate said wheels to roll upon the ground to move said object;

g. evacuating fluid from said lift bladder, providing a contracting lift bladder so as to lower said base, lowering said bottom edge of said sidewalls to rest upon the ground; and h. concealing said wheels.

While the exemplary embodiment of the invention contemplates a circular ring in the form of a tire inner tube as the lift bladder, it is reiterated that this is just an example and not intended to be limiting. The cavity formed in the base and lift bladder can be of various diverse configurations, dimensions, materials, and layout, and operate within similar characteristics.

Further, while the exemplary embodiment of the present invention teaches a teaches a separate drain bowl encompassing the invention upon which is placed a pot or other object, the present system may be utilized with a planter unit comprising an integrated pot and drain bowl, or pot with the base of the drain bowl and system integrated therein. A further alternative embodiment of the present invention may be utilized with uses other than a drain bowl or planter. The present system may be utilized in a variety of applications and the exemplary and alternative embodiments are not intended to be limiting as to the scope of the invention.

The invention embodiments herein described are done so in detail for exemplary purposes only, and may be subject to many different variations in design, structure, application and operation methodology. Thus, the detailed disclosures therein should be interpreted in an illustrative, exemplary manner, and not in a limited sense.

What is claimed is:

1. A lifting system, comprising:

a support surface having a base, said base having formed therein a bottom and sidewalls, said sidewalls having a cavity formed therebetween having an upper wall;

a lift platform situated in said cavity, said lift platform having upper and lower surfaces, said lower surface having wheels mounted thereto;

a lift bladder situated upon said lift platform within said cavity formed in said base;

whereby said bottom of said base is formed to rest upon the ground until said lift bladder is filled with fluid, whereupon said lift bladder expands to engage said side walls and upper wall forming said cavity so as to prevent further sideways and upward expansion of said bladder, facilitating force against said lift platform to lift said base from the ground so that said base is supported by said wheels mounted to said lower surface of said lift platform.

2. The lifting system of claim 1, wherein said lift bladder comprises a cylindrical bladder in the form of a ring.

3. The lifting system of claim 2, wherein there is further provided an air tube having first and second ends, said first end of said air tube communicating with said lifting bladder, said second end of said air tube situated exterior of said base.

4. The lifting system of claim 3, wherein said second end of said air tube has mounted thereon a valve.

5. The lifting system of claim 1, wherein said lift bladder and said support platform each has a hole centrally formed therethrough.

6. The lifting system of claim 5, wherein said base has further provided a central load bearing member formed to pass through said holes formed centrally through said lift bladder and said support platform, whereby upon inflation of said lift bladder, said central load bearing member lifts above the ground, and upon the deflation of said lift bladder, said central load bearing member lowers to engage the ground.

7. The lifting system of claim 1, wherein said bladder is formed to be filled with air.

8. The lifting system of claim 6, wherein said central load bearing member has a lower edge, and wherein said bottom of said body comprises said lower edge of said central load bearing member.

9. The lifting system of claim 5, wherein said sidewalls of said base have a lower edge, and wherein said lower edge of said sidewalls comprises said bottom of said base.

10. The method of repositioning an object, comprising the steps of:
   a. providing a lifting system, comprising:
      a support surface having a base having a central load bearing member, said base also having formed therein sidewalls having a bottom edge, and a cavity formed therebetween having an upper wall;
      a lift platform situated in said cavity, said lift platform having top and bottom surfaces, said bottom surface having wheels mounted thereto, said lift platform having a central opening formed therethrough to facilitate the passage of said central load bearing member therethrough;
      a lift bladder situated upon said lift platform within said cavity formed in said base, said lift bladder having a central opening formed therethrough formed to facilitate the passage of said central load bearing member therethrough;
   b. placing said object upon said support surface;
   c. allowing said bottom edge of said sidewalls of said base and said central load bearing member to rest upon the ground, with said central load bearing member passing through said central opening formed through said lift platform and said lift bladder;
   d. filling said lift bladder with fluid, providing an expanding lift bladder;
   e. allowing said expanding lift bladder to urge said base upward, raising said bottom edge of said sidewalls above the ground so that said base is supported by said wheels mounted to said bottom surface of said lift platform;
   f. applying force to said object so as to facilitate said wheels to roll upon the ground to move said object;
   g. evacuating fluid from said lift bladder, providing a contracting lift bladder so as to lower said base, lowering said bottom edge of said sidewalls to rest upon the ground; and
   h. concealing said wheels.

11. A lifting system, comprising:
   a support surface having a base, said base having formed therein a bottom and a central load bearing member, said base also having a cavity formed therein having an upper wall and a sidewall;
   a lift platform situated in said cavity, said lift platform having upper and lower surfaces, said lower surface having wheels mounted thereto;
   a lift bladder situated upon said lift platform within said cavity formed in said base, said lift bladder having a central opening formed therethrough formed to facilitate the passage of said central load bearing member therethrough;
   whereby said bottom of said base rest upon the ground with said central load bearing member passing through said central opening formed through said lift bladder until said lift bladder is filled with fluid, whereupon said lift bladder is formed to urge said base upward, so as to raise said bottom of said base, including said central load bearing member, above the ground so that said base is supported by said wheels mounted to said lower surface of said lift platform.

12. The lifting system of claim 11, wherein said lift bladder comprises a cylindrical bladder in the form of a ring.

13. The lifting system of claim 12, wherein there is further provided an air tube having first and second ends, said first end of said air tube communicating with said lifting bladder, said second end of said air tube situated exterior of said base.

14. The lifting system of claim 13, wherein said second end of said air tube has mounted thereon a valve.

15. The lifting system of claim 14, wherein said lift platform has formed therethrough a central opening formed to facilitate the passage of said central load bearing member therethrough, and wherein said central opening formed through said lift bladder and said support platform are aligned.

16. The lifting system of claim 11, wherein said base has a perimeter, wherein said lift bladder has a perimeter about equal to said perimeter of said base, whereby, upon inflation of said lift bladder, said base is supported evenly about said perimeter of said base by said lift bladder.

17. The lifting system of claim 11, whereby, upon the bladder being filled with fluid, said lift bladder expands to engage said side walls and upper wall forming said cavity so as to prevent further sideways and upward expansion of said bladder, facilitating downward force against said lift platform, so as to lift the base from the ground.

18. The lifting system of claim 17, wherein said central load bearing member has a lower edge, and wherein said bottom of said body comprises said lower edge of said central load bearing member.

19. The method of repositioning an object, comprising the steps of:
   a. providing a lifting system, comprising:
      a support surface having a base, said base having a bottom and a central load bearing member, said base having formed therein a cavity having an upper wall;
      a lift platform situated in said cavity, said lift platform having upper and lower surfaces, said lower surface having wheels mounted thereto, said lift platform having a central opening formed therethrough to facilitate the passage of said central load bearing member therethrough;
      a lift bladder situated upon said lift platform within said cavity formed in said base, said lift bladder having a central opening formed therethrough formed to facilitate the passage of said central load bearing member therethrough;
   b. placing said object upon said support surface;
   c. allowing said bottom of said base with said central load bearing member to rest upon the ground, with said central load bearing member passing through said central opening formed through said lift platform and said lift bladder;
   d. filling said lift bladder with fluid, providing an expanding lift bladder;
   e. allowing said expanding lift bladder to urge said base upward, raising said bottom of said bases above the ground so that said base is supported by said wheels mounted to said bottom surface of said lift platform;
   f. applying force to said object so as to facilitate said wheels to roll upon the ground to move said object;

g. evacuating fluid from said lift bladder, providing a contracting lift bladder so as to lower said base, lowering said bottom of said base to rest upon the ground.

20. The method of claim 19, wherein there is further provided in step "a." the step of providing in said base a sidewall having a lower edge, and wherein there is provided the additional step "h." after step "g." of utilizing said sidewall to conceal said wheels.

21. A pneumatic lifting system, comprising:
a support surface having a base, said base having formed therein a bottom and sidewalls, said sidewalls having a cavity formed therebetween having an upper wall;
a lift platform situated in said cavity, said lift platform having upper and lower surfaces, said lower surface having wheels mounted thereto;
a lift bladder having an annular form situated upon said lift platform within said cavity formed in said base;
whereby said bottom of said base is formed to test upon the ground until said lift bladder is filled with fluid, whereupon said lift bladder is formed to uniformly lift said support surface to urge said base upward, raising said bottom of said base above the ground so that said base is supported by said wheels mounted to said lower surface of said lift platform.

22. The pneumatic lifting system of claim 21, wherein said lift bladder comprises a cylindrical bladder in the form of a ring.

23. The pneumatic lifting system of claim 22, wherein there is further provided an air tube having first and second ends, said first end of said air tube communicating with said lifting bladder, said second end of said air tube situated exterior of said base.

24. The pneumatic lifting system of claim 23, wherein said second end of said air tube has mounted thereon a valve.

25. The pneumatic lifting system of claim 21, wherein said lift bladder and said support platform each has a hole centrally formed therethrough.

26. The pneumatic lifting system of claim 25, wherein said base has further provided a central load bearing member formed to pass through said holes formed centrally through said lift bladder and said support platform, whereby upon inflation of said lift bladder, said central load bearing member lifts above the ground, and upon the deflation of said lift bladder, said central load bearing member lowers to engage the ground.

27. The pneumatic lifting system of claim 26, whereby, upon the bladder being filled with fluid, said lift bladder expands to engage said side walls and upper wall forming said cavity so as to prevent further sideways and upward expansion of said bladder, facilitating downward force against said lift platform, so as to lift to base from to ground.

28. The pneumatic lifting system of claim 27, wherein said central load bearing member has a lower edge, and wherein said bottom of said body comprises said lower edge of said central load bearing member.

29. The pneumatic lifting system of claim 25, wherein said sidewalls of said base have a lower edge, and wherein said lower edge of said sidewalls comprises said bottom of said base.

* * * * *